(12) United States Patent
Lowe et al.

(10) Patent No.: US 12,462,136 B2
(45) Date of Patent: *Nov. 4, 2025

(54) TRANSACTION CARD WITH PARTIAL GLASS LAYER

(71) Applicant: CompoSecure, LLC, Somerset, NJ (US)

(72) Inventors: Adam Lowe, Somerset, NJ (US); Kristin Potocki, Hamilton, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,724

(22) Filed: Jul. 19, 2024

(65) Prior Publication Data

US 2024/0370689 A1    Nov. 7, 2024

Related U.S. Application Data

(63) Continuation of application No. 18/034,152, filed as application No. PCT/US2021/056967 on Oct. 28, 2021.

(60) Provisional application No. 63/107,698, filed on Oct. 30, 2020.

(51) Int. Cl.
    *G06K 19/077*    (2006.01)
(52) U.S. Cl.
    CPC ............................... *G06K 19/07722* (2013.01)
(58) Field of Classification Search
    CPC .................................................. G06K 19/07722
    USPC ......................................................... 235/492
    See application file for complete search history.

(56) References Cited

U.S. PATENT DOCUMENTS

| | | | |
|---|---|---|---|
| 8,033,474 | B2 | 10/2011 | Lasch et al. |
| 10,762,412 | B2 | 9/2020 | Lowe et al. |
| 2008/0239644 | A1 | 10/2008 | Cassidy et al. |
| 2013/0248607 | A1 | 9/2013 | Zlotnik |
| 2016/0180212 | A1 | 6/2016 | Herslow et al. |
| 2016/0365644 | A1 | 12/2016 | Finn et al. |
| 2017/0286725 | A1 | 10/2017 | Lewis |
| 2020/0051061 | A1 | 2/2020 | Gandolfo |

(Continued)

FOREIGN PATENT DOCUMENTS

| | | |
|---|---|---|
| AR | 106662 A1 | 2/2018 |
| EP | 2 137 456 A1 | 12/2009 |

(Continued)

OTHER PUBLICATIONS

International Preliminary Report on Patentability for International Application No. PCT/US2021/056967, dated May 2, 2023 (9 pages).

(Continued)

*Primary Examiner* — Allyson N Trail
(74) *Attorney, Agent, or Firm* — Buchanan Ingersoll & Rooney PC

(57) ABSTRACT

A transaction card having a partial glass layer including an interior glass member connected to a non-glass frame. The frame defines opposite planar surfaces, has an outer periphery coextensive with the outer periphery of the card, and has a frame inner periphery spaced radially inward from the frame outer periphery. The frame inner periphery defines an interior area occupied by the glass member. The transaction card further includes at least one additional layer having a periphery coextensive with the periphery of the card, and a payment module configured for contactless operation or dual interface contact/contactless operation.

26 Claims, 3 Drawing Sheets

(56) References Cited

U.S. PATENT DOCUMENTS

| | | |
|---|---|---|
| 2020/0160135 A1 | 5/2020 | Lowe et al. |
| 2020/0257953 A1 | 8/2020 | Lotya et al. |
| 2021/0110231 A1 | 4/2021 | Finn |
| 2021/0158124 A1 | 5/2021 | Lowe et al. |
| 2021/0340056 A1 | 11/2021 | Zhang et al. |
| 2022/0051067 A1 | 2/2022 | Zheng et al. |

FOREIGN PATENT DOCUMENTS

| | | |
|---|---|---|
| JP | S49-083997 U | 7/1974 |
| JP | 2002269522 A | 9/2002 |
| JP | 2017524171 A | 8/2017 |
| TW | 201640411 A | 11/2016 |
| WO | 9316445 A1 | 8/1993 |
| WO | 2008/115598 A1 | 9/2008 |
| WO | 2017007468 A1 | 1/2017 |
| WO | 2017/081508 A1 | 5/2017 |
| WO | 2019079007 A1 | 4/2019 |
| WO | 2020/078377 A1 | 4/2020 |
| WO | 2020/119643 A1 | 6/2020 |

OTHER PUBLICATIONS

International Search Report and Written Opinion for International Application No. PCT/US2021/056967, dated Jan. 31, 2022 (11 pages).

Office Action (Examination report No. 1 for standard patent application) issued Sep. 27, 2023, by the Australian Government, IP Australia in corresponding Australian Patent Application No. 2021371164. (4 pages).

Office Action (Examination report No. 2 for standard patent application) issued Feb. 8, 2024, by the Australian Government, IP Australia in corresponding Australian Patent Application No. 2021371164. (4 pages).

Office Action (Notice of Reasons for Rejection) issued Apr. 2, 2024, by the Japan Patent Office in corresponding Ig] Japanese Patent Application No. 2023-526364 and an English translation of the Office Action. (18 pages).

Taiwanese Office Action with Search Report for Taiwanese Application No. 112126300, dated Nov. 30, 2023 (16 pages).

U.S. Appl. No. 62/971,439, mailed Nov. 10, 2020 (44 pages).

Office Action (Decision of Final Rejection) issued Oct. 8, 2024, by the Japan Patent Office in corresponding Japanese Patent Application No. 2023-526364 and an English translation of the Office Action. (16 pages).

English translation of Examination Report issued Aug. 7, 2024 in Patent application No. AR123959A1. (5 pages).

Office Action issued Oct. 11, 2024, by the Canadian Intellectual Property Office in corresponding Canadian Patent Application No. 3,196,905. (13 pages).

Office Action (Decision to Grant a Patent) issued Apr. 22, 2025, by the Japan Patent Office in corresponding Japanese Patent Application No. 2023-526364 and an English translation of the Office Action. (4 pages).

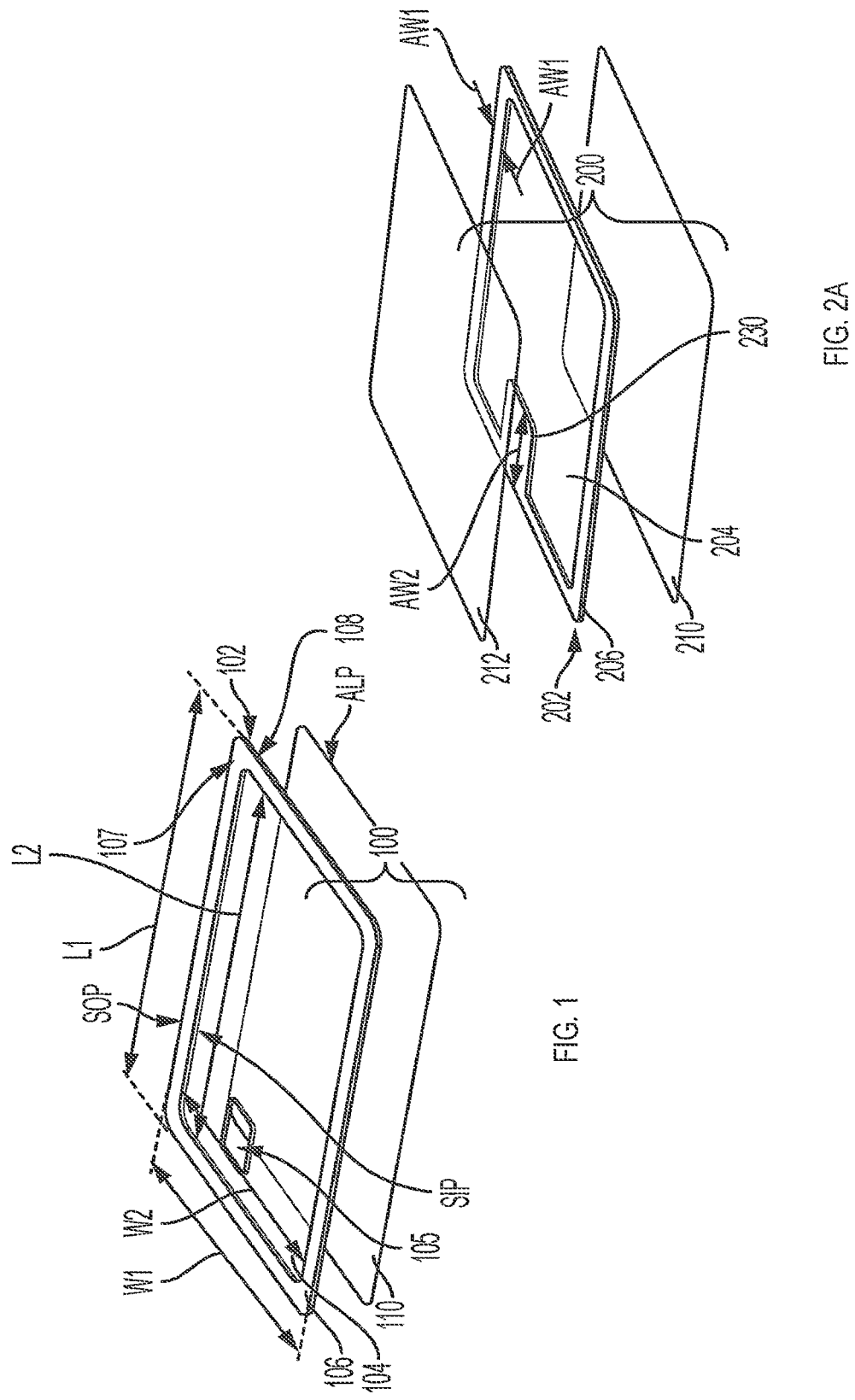

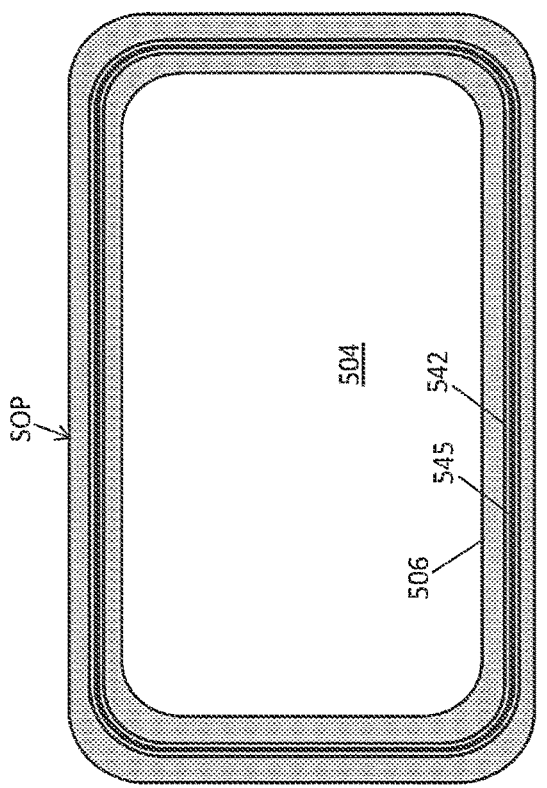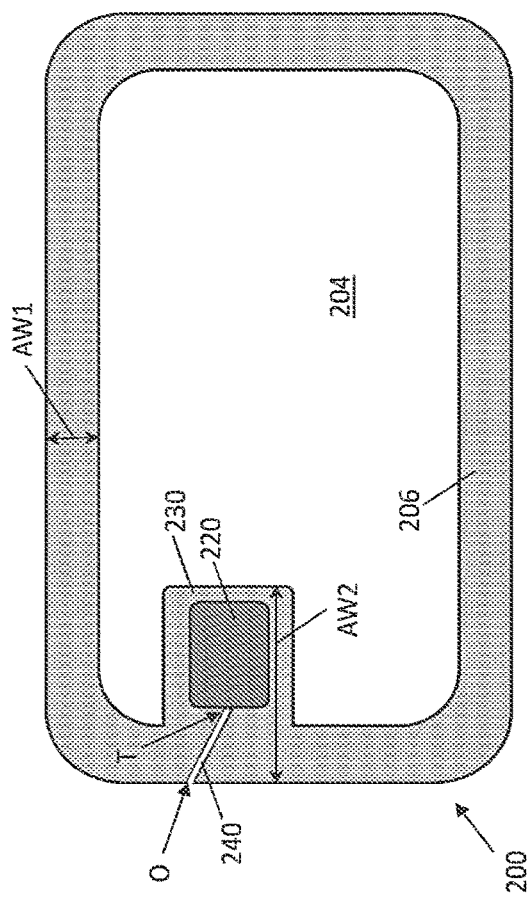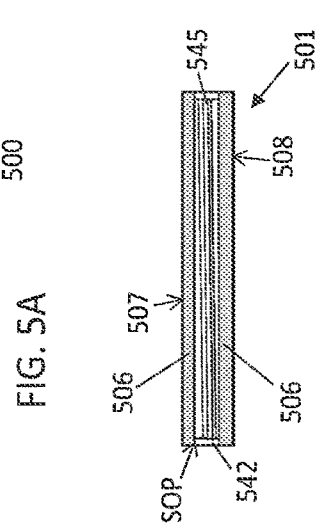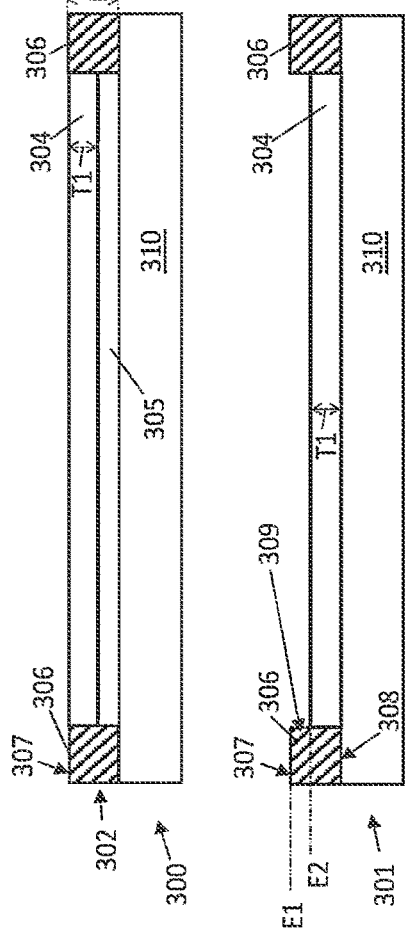

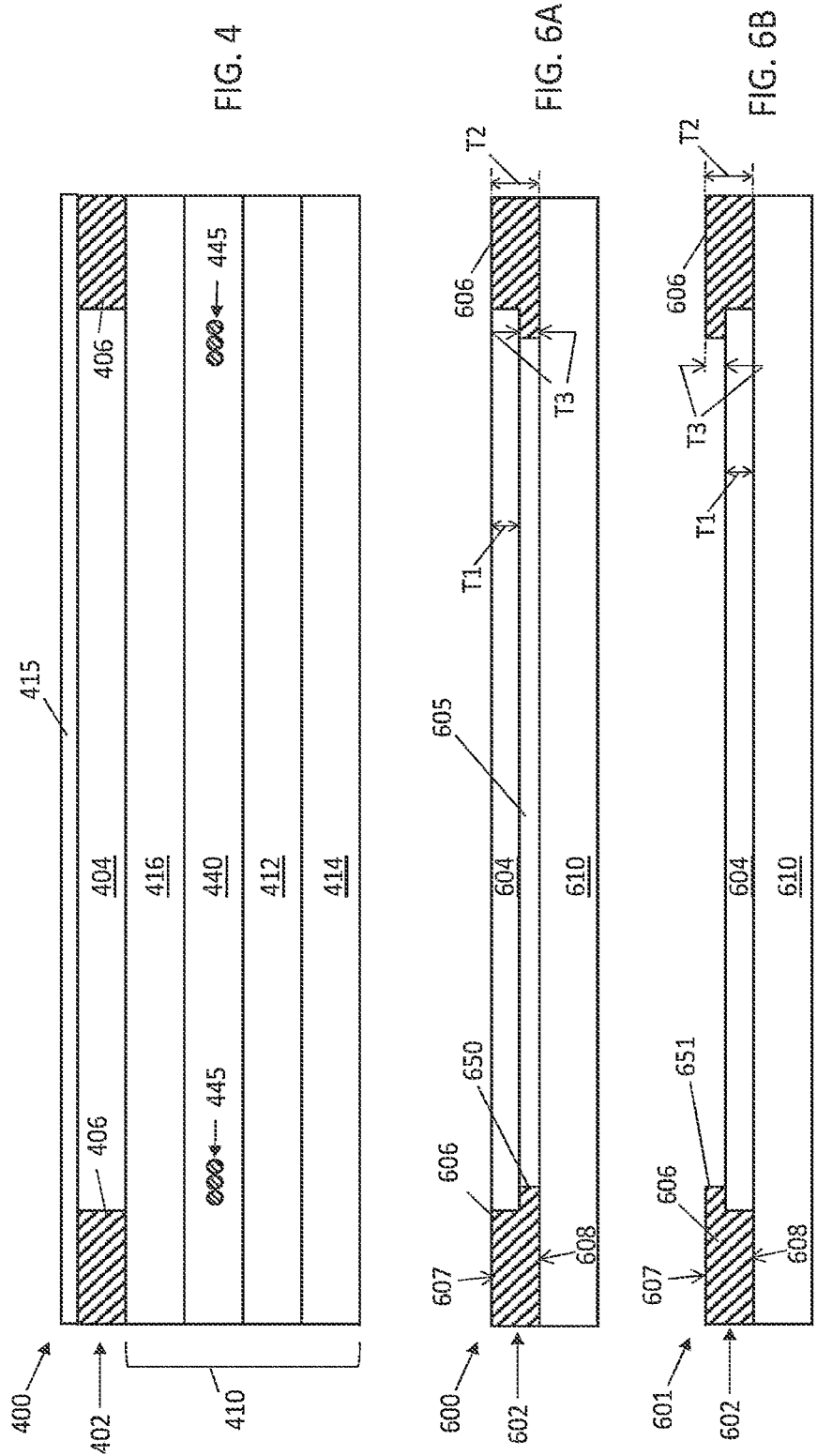

TRANSACTION CARD WITH PARTIAL GLASS LAYER

CROSS-REFERENCE TO RELATED APPLICATIONS

This application is a Continuation application of U.S. application Ser. No. 18/034,152, filed Apr. 27, 2023 (status: Allowed) which is a U.S. National Phase Patent Application of PCT Patent Application No. PCT/US2021/056967, filed Oct. 28, 2021, which is related to and claims priority to U.S. Provisional Application Ser. No. 63/107,698, filed Oct. 30, 2020, titled TRANSACTION CARD WITH PARTIAL GLASS LAYER, the contents of each of which are incorporated herein by reference in their entireties for all purpose.

BACKGROUND OF THE INVENTION

Credit card issuers continue to seek transaction cards comprising materials that having a desirable weight and appearance, with optimal performance. In recent years various types of conformable or high-strength glass have been developed that have strong break and scratch resistance, and add weight and a modern appearance to a card. However, glass members may still be somewhat weaker or prone to damage than other types of materials, and thus the field is in need of constructions that minimize the risk of damage, optimize functionality, and maximize the overall look and feel of the card.

SUMMARY OF THE INVENTION

One aspect of the invention includes a transaction card having lateral dimensions that define an outer periphery and an area. The transaction card has a partial glass layer including an interior glass member connected to a non-glass frame. The glass member may be conformable glass. The frame defines opposite planar surfaces and has a frame outer periphery coextensive with the outer periphery of the card, and a frame inner periphery spaced radially inward from the frame outer periphery. The frame inner periphery defines an interior area occupied by the glass member. The transaction card further includes at least one additional layer having a periphery coextensive with the periphery of the card, and a payment module configured for contactless operation or dual interface contact/contactless operation.

The additional layer may include a pair of opposite capping layers, such as formed of: polymeric materials, ceramic, or glass, wherein the partial glass layer is disposed between the pair of opposite capping layers. The additional layer may have printed information or graphics.

In some embodiments, the frame defines a first width between the frame outer periphery and the frame inner periphery for at least a first portion of the frame, and a tab defining a second width greater than the first width for at least a second portion of the frame, wherein the payment module is embedded in the tab.

In some embodiments, the glass member may have a first thickness, with the frame having a second thickness greater than the first thickness. In such embodiments, the may further have a layer of adhesive in a region bordered by the glass member, the frame, and the at least one additional layer of the transaction card.

In some embodiments, the frame may comprise metal. The metal of the frame may have at least one discontinuity defining a gap extending from the outer periphery of the frame to the inner periphery of the frame, and may optionally have a non-metal filler disposed within the gap defined by the discontinuity. The metal frame having such a discontinuity may comprise a booster antenna physically or inductively coupled to the payment module. In some embodiments, the additional layer may comprise a booster antenna layer comprising a booster antenna physically or inductively connected to the payment module. In such embodiments, additional layers may include least a non-metal base layer and one or more printed layers and/or a non-RF-impeding layer disposed between the booster antenna and the metal frame. In one metal frame embodiment, the frame may have a thickness greater than the thickness of the glass member in which the partial glass layer is an outermost layer of the transaction card, wherein the frame defines a greater elevation on the surface of the card relative to the additional layer than an elevation defined by the glass member.

In other embodiments, the frame may comprise a non-metal material, such as but not limited to epoxy, FR4 ceramic, carbon fiber, and a plant-based material. In such embodiments, a booster antenna physically or inductively coupled to the payment module may comprise a winding disposed within a groove disposed in the frame. The groove may be disposed on a top or bottom surface of the frame, or a combination thereof, and radially inset from the outer peripheral edge of the frame. Filler may be disposed over the booster antenna in the groove.

In some embodiments, the inner periphery of the frame defines a non-stepped edge between the top planar surface and the bottom planar surface of the frame, such as a straight edge perpendicular to the top planar surface and the bottom planar surface. In such embodiments, the glass member defines a non-stepped outer peripheral edge aligned with and adhesively connected to the non-stepped edge defined by the inner periphery of the frame.

In other embodiments, the inner periphery of the frame defines a stepped edge between the top planar surface and the bottom planar surface of the frame, the stepped edge defining a ledge intermediate the top planar surface and the bottom planar surface of the frame, wherein a surface of the glass member is supported by the ledge, such as a ledge that defines a planar surface parallel to the top planar surface and the bottom planar surface of the frame. In such embodiments, the glass member may have a first thickness, the frame a second thickness greater than the first thickness, and the ledge may have a thickness equal to a difference between the first thickness and the second thickness. The ledge defined by the frame may be disposed between the glass member and the additional layer. An intermediate layer, having a periphery defined by an inner periphery of the ledge, may be disposed between the glass member and the additional layer, such as an adhesive layer or a transparent layer, such as glass. The glass member may be disposed between the additional layer and the ledge defined by the frame, particularly in embodiments in which the frame consists of metal.

At least one protective layer may be disposed over the partial glass layer or the partial glass layer may constitute an outermost layer of the transaction card. The partial glass layer may have an outer protective layer adhered thereto that constitutes an outermost layer of the transaction card.

BRIEF DESCRIPTION OF THE DRAWINGS

FIG. 1 depicts a perspective schematic, exploded view of an exemplary transaction card embodiment having a glass member with a non-glass frame.

FIG. 2A depicts a perspective schematic, exploded view of an exemplary transaction card embodiment having a glass member with a metal frame sandwiched between capping layers.

FIG. 2B depicts a schematic plan view of the card embodiment of FIG. 2A.

FIG. 3A depicts a schematic cross-sectional view of an exemplary card embodiment in which the glass member and the frame have different thicknesses.

FIG. 3B depicts a schematic cross-sectional view of an exemplary card embodiment in which the glass member and the frame have different thicknesses in which the glass member defines an outer surface of the card inset at a lower elevation than the elevation of the frame.

FIG. 4 depicts a schematic cross-sectional view of an exemplary card embodiment having a booster antenna layer among other stacked layers of the card.

FIG. 5A depicts a schematic plan view of an exemplary card embodiment in which the frame includes an embedded booster antenna on a top or bottom surface of the card.

FIG. 5B depicts a schematic cross-sectional view of an exemplary card embodiment in which the frame includes an embedded booster antenna in a groove extending from the frame outer periphery between the top and bottom surfaces of the card.

FIG. 6A depicts schematic cross-sectional view of an exemplary card embodiment in which the frame has a stepped interior periphery that forms a ledge that supports the glass member.

FIG. 6B depicts schematic cross-sectional view of an exemplary card embodiment in which the frame has a stepped interior periphery that forms an overhang that radially overlaps the glass member

DETAILED DESCRIPTION OF THE INVENTION

Referring now to the figures, none of which are intended to be to scale or proportion, there is shown in FIG. 1, an exemplary transaction card embodiment 100 having lateral dimensions (length L1 and width W1) that define a card outer periphery COP and an area (L1×W1). While depicted in FIG. 1 with dimensions in which L1 is generally greater than W1, such as in conformance with the ISO/IEC 7810 ID-1 standard in which L1×W1=85.60×53.98 mm (3⅜ in×2⅛ in), with rounded corners having a radius of 2.88-3.48 mm (about ⅛ in), and an overall thickness of 0.76 millimetres (1/32 in), the invention is not limited to cards having any particular size, shape or proportion. Partial glass layer 102 includes an interior glass member 104 connected to a non-glass frame 106. Frame 106 defines opposite planar surfaces (upper surface 107 and lower surface 108 as positioned in FIG. 1). The frame outer periphery (FOP) is coextensive with the card outer periphery COP. A frame inner periphery (FIP) is spaced inward from the frame outer periphery (FOP). The frame inner periphery has lateral dimensions (length L2 and width W2) that define an interior area (L2×W2) occupied by the glass member 104. At least one additional layer 110 has a periphery ALP aligned with the frame outer periphery FOP, which together define the outer periphery of card 100. In one embodiment, frame 106 comprises metal and the at last one additional layer comprises plastic. Suitable metals for the frame may comprise stainless steel, aluminum, tungsten, precious or exotic metals, such as gold, titanium, or the like, and combinations or alloys of any of the foregoing. Combinations of materials, including combinations of metals and non-metals (e.g. metal with a ceramic coating; non-metal with a metal foil layer; steel with a gold foil cladding) May also be used in the frame. Suitable plastic layers for the at least one additional layer comprise any types of plastics known for use in cards, including but not limited to, PVC, polyester, PET, HDPE, and the like, as well as blends or co-polymers of the same. Glass layer 104 has a recess 105 (which may be a though-hole or a pocket open to only one surface) configured to receive a payment module (not shown in FIG. 1). The payment module, which may be any type of payment module known in the art, typically comprises an integrated circuit (IC) chip configured for at least contactless (e.g. radio frequency (RF) identification—RFID) operation, and preferably comprises an IC chip configured for dual interface (contact and contactless) operation, as is well known in the art.

Glass member 104 preferably comprises high-strength, flexible or conformable glass, such but not limited to aluminosilicate, borosilicate, boro-aluminosilicate glass, sapphire glass, or ion-exchange-strengthened glass. Numerous examples of such flexible or conformable glasses are known in the art, and are favored for their shatter-resistant properties and strength. Such types of glass are also denser than traditional plastic layers found in some transaction cards, and therefore lend additional heft or weight to the overall look and feel of a card. Although preferred embodiments comprise flexible or conformable glass compositions, the term "glass" as used herein refers to any material having any non-polymeric chemical composition (i.e. non-plastic), typically inorganic, and often containing $SiO2$ or $Al2O3$ as a primary component (but without any limitation thereto), that is transparent or semi-transparent, including amorphous non-crystalline compounds as well as crystalline compounds, sometimes also referred to as "crystal." Additionally, acceptable glass layers may include glass varieties known as "safety glass," including laminated glass (comprising one or more layers each of glass and plastic, typically held together by an interlayer), toughened (tempered) glass and engraved glass. While glass having transparency or semi-transparency may have certain advantages, embodiments of the invention may include embodiments in which the interior member 104 comprising other non-metal or non-plastic materials (e.g. ceramic) that are opaque or only translucent. Although depicted as a monolithic layer, the partial glass layer may comprise a composite of multiple material layers, including multiple glass layers of the same or different types of glass. In some embodiments, the at least one additional layer 110 may comprise at least one metal layer. In some embodiments, the glass may be coated with adhesives or coatings, such as coatings that are decorative, structural, or designed to control optics (e.g. infrared (IR) blockers) or radio frequency (RF) (e.g. RF blockers).

In the exemplary transaction card embodiment 200 depicted in FIGS. 2A and 2B, partial glass layer 202, comprising interior glass member 204 and non-glass frame 206, is disposed between a pair of opposite capping layers 210, 212. In preferred embodiments, the opposite capping layers may comprise polymeric materials, ceramic, and/or glass. In both the embodiments of FIGS. 1 and 2A, 2B, one or more of layers 110, 210, 212, or other additional layers (not shown), may comprise information or graphics. The information/graphics may be printed or disposed using any technology known (e.g. etching, laser treating, etc.) on the capping layers or partial glass layer directly, or may be disposed on one or more other layers. Any of the layers 110, 210, 212 may each comprise a plurality of layers in some embodiments, such as layers laminated together. Any of the card embodiments as disclosed herein may include any types layers of any a dimension coextensive with the lateral dimensions of the card, or smaller, known for use in credit cards, without limitation, including decorative layers (e.g. wood, leather, ceramic, metal), layers comprising magnetic stripes, layers comprising signature blocks, and the like.

In the embodiment depicted in FIGS. 2A and 2B, frame 206 defines a first annular width AW1 between the frame outer periphery and the frame inner periphery for at least a first portion of the frame, and tab 230 defines a second width AW2 greater than the first width for at least a second portion of the frame. The frame may have the same annular width around the entire periphery of the card (except in the location of the tab, in embodiments with a tab), or the annular width may be different on different sides of the card. For example, the frame may have a first width along the relatively longer sides of the card and a second width along the relatively shorter sides of the card, each side of the card may have a different annular width than the others, or one side of the card may have a different annular width than the others. The annual width may be variable along one or more edges of the card. Card embodiments are not limited to only a singular tab, nor are tabs limited to providing support for a payment module. In other embodiments, addition or alternately located tabs (not shown) may also be provided to align or provide support for other aspects of the card, such as a display screen or a biometric sensor. Payment module 220 is embedded in tab 230.

In some embodiments, such as the embodiment depicted in FIGS. 2A and 2B, frame 206 may comprise metal. The metal of the frame may include at least one discontinuity 240 defining a gap extending through the entire thickness of the frame in the Z direction and laterally from an origin O on the outer periphery of the frame to a terminus T located on the inner periphery of the opening in the tab 230 for accommodating the payment module 220. A non-metal filler (not shown), such as a non-RF-interfering filler, may be disposed within the gap defined by the discontinuity. Although depicted having a diagonal, straight geometry, discontinuity 240 may have any geometry known in the art, including stepped, curved, sinusoidal, zig-zag, or combinations thereof. The relative locations of the origin (O) and terminus (T) are not limited to an particular locations. They may be aligned with one another along a line parallel to the long edges of the card that define the length of the card, or one of the terminus or the origin may be relatively closer to one of the long edges of the card than the other. Exemplary, non-limiting geometries for the discontinuity may conform to any of the geometries shown or described in U.S. Pat. No. 10,762,412, titled DI CAPACITIVE EMBEDDED METAL CARD, incorporated herein by reference. Discontinuities may be provided in other locations in the card, including one or more discontinuities that extend from the outer periphery of the frame to the inner periphery of the frame, or one or more discontinuities that do not have a terminus or an origin on one of the outer or inner peripheries. Exemplary, non-limiting geometries for such discontinuities may conform to any of the geometries shown or described in U.S. Provisional Patent Application Ser. No. 62/971,439, titled DI METAL TRANSACTION DEVICES AND PROCESSES FOR THE MANUFACTURE THEREOF, incorporated herein by reference in its entirety. In constructions having a metal frame, especially those with any of the foregoing discontinuities, filled or unfilled, the metal frame may serve as a booster antenna that is physically or inductively coupled to the payment module. Notably, although not depicted and not preferred, the configuration in FIG. 1, when frame 106 comprises metal, may also have one or more of the discontinuities as described above.

Referring to FIG. 4, in other embodiments having a metal frame (typically, but not always, without the discontinuity), the additional layers 410 of card 400 may include a booster antenna layer 440 comprising a booster antenna 445 (e.g. comprising a plurality of metal windings, as is well known in the art) physically or inductively connected to the payment module. In such embodiments, the additional layers may include a first stack 410 comprising at least a non-metal (e.g. plastic) base layer 412 and one or more printed layers 414. A non-RF-impeding layer (e.g. ferrite) 416 may be disposed between the booster antenna layer 440 and the metal frame 406, although may not be necessary in connection with some antenna designs. The various layers may be hot or cold laminated together and/or may contain adhesive layers and/or adhesive carrier sheets between the functional layers. Also depicted is a top layer 415, which may comprise a transparent layer (e.g. polymer, a hardcoat comprising inorganic particles or nanoparticles in resin, or the like, without limitation) that protects the glass and metal layers from scratching and which may have printing or graphics thereon, such as printing or graphics identifying the type of card (e.g. VISA, American Express, etc.), issuer (e.g. bank name), cardholder name, and the like. Fewer or additional layers may be present than those shown.

In some embodiments, the frame comprises a non-metal material, such as but not limited to epoxy, FR4, ceramic, carbon fiber, or plant-based materials, such as wood. Embodiments comprising a non-metal frame, such as the card embodiment 500 depicted in FIG. 5A, may be particularly well-suited to include a booster antenna physically or inductively coupled to the payment module, wherein the booster antenna comprises one or more windings 545 disposed within a groove 542 defined within the frame. As shown in FIG. 5, frame 506 defines a frame outer periphery (FOP), and the groove 542 is radially inset from the FOP. A filler (not shown) may be disposed over the winding(s) 545 in the groove 542. An additional layer or layers may cover the frame to hide the groove and/or fill. The winding and groove may be disposed on either or both surfaces of the frame, and may include one or more vias from a groove on one side to a groove on the other side. In the card embodiment 501 depicted in FIG. 5B in cross section, the groove 542 extends from the frame outer periphery FOP radially inward between the top 507 and bottom 508 surfaces of the frame, and the windings 545 are wound around the periphery within the cross-sectional volume of the card. In such embodiments, a fill (not shown) is typically applied over the windings, so that the resulting FOP has a smooth edge between the upper surface and the lower surface of the frame. Embodiments having a metal frame may also include an embedded booster antenna of any of the designs as described herein, with the groove lined and/or the windings covered with a non-metal, non-RF-impeding material such as ferrite to minimize interference.

Referring now to the cross section depicted in FIG. 3A, the glass member 304 of layer 302 in card 300 may have a first thickness T1 in the Z direction and the frame 306 may have a second thickness T2 greater than the first thickness. Fill, such as a layer of adhesive may be disposed as fill in a volume 305 bordered by the glass member 304, the frame 306, and the at least one additional layer 310. The glass member 304 and the upper surface 307 of frame 306 preferably lie on a common plane. In the embodiment depicted in FIG. 3B, partial glass layer 302 constitutes an outermost (exposed) layer of the transaction card 301. Surface 307 of frame 306 is an exposed surface that defines a plane having a greater elevation E1 on the surface of the card relative to the at least one additional layer 310 than an elevation E2 corresponding to the plane defined by the glass member. The inset elevation of the glass member allows the frame to protect the glass.

In the embodiment depicted in, e.g., FIG. 3B, the inner periphery of the frame 306 defines a straight edge 309 between the top planar surface 307 and the bottom planar surface 308 of the frame, in which the straight edge is perpendicular to the top planar surface and the bottom planar surface. Likewise, glass member 304 defines a straight outer peripheral edge 303 aligned with and adhesively connected to the straight edge 309 defined by the inner periphery of the frame. In other embodiments, the inner periphery may define edges that have a non-straight geometry, as described further below, and even in embodiments with relatively straight edges, radii may be curved and one or more protrusions or indentations may be present. The geometry depicted in FIG. 3B may also be referred to as a "non-stepped" edge, by comparison to the corresponding edges depicted in FIGS. 6A and 6B, wherein non-stepped refers to a geometry that does not include a step, but may have a geometry other than straight.

In other embodiments, such as in cards 600 and 601 depicted in FIGS. 6A and 6B, and particularly useful for embodiments with a metal frame, the inner periphery of the frame 606 defines a stepped edge 609 between the top planar surface 607 and the bottom planar surface 608 of the frame. The stepped edge 609 defines a ledge 650 or overhang 651 intermediate the top planar surface and the bottom planar surface of the frame, which ledge or overhang interfaces with a surface of the glass member 604. As depicted in FIGS. 6A and 6B, ledge 650 or overhang 651 defines a planar surface facing the glass layer parallel to the top planar surface and the bottom planar surface of the frame, but the ledge is not limited to such a construction, and the glass layer may be contoured to mate with a contoured surface of the ledge or overhang. As depicted in FIGS. 6A and 6B, glass member 604 has a first thickness T1 in the Z direction and the frame 606 has a second thickness T2 greater than the first thickness, and ledge 650 or overhand 651 have a thickness T3 equal to the difference (T2−T1) between the first thickness and the second thickness. Volume 605 may comprise an unfilled volume, or may be filled, such with an adhesive or other type of flowable or curable filler, such as a transparent or translucent filler, or may comprise a preformed layer, such as another layer of glass or a non-glass transparent material. 20) The materials of volume 605 may comprise any other material known in the art.

As depicted in FIG. 7A, the card is assembled with ledge 750 disposed between glass member 704 and additional layer 710. As depicted in FIG. 7B, the card is assembled with glass member 704 disposed between layer 110 and the ledge 750, and with layer 702 constituting an outermost layer of transaction card 700. In the construction depicted in FIG. 7B, the frame preferably comprises, consists of, or consists essentially of a metal material.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A transaction card, the transaction card having lateral dimensions that define an outer periphery and an area, the transaction card comprising:
    a partial glass layer comprising an interior glass member connected to a non-glass frame, the frame defining opposite planar surfaces, a frame outer periphery coextensive with the outer periphery of the card, and a frame inner periphery spaced radially inward from the frame outer periphery, the frame inner periphery defining an interior area occupied by the glass member;
    at least one additional layer having a periphery coextensive with the periphery of the card; and
    a payment module configured for contactless operation or dual interface contact/contactless operation.

2. The transaction card of claim 1, wherein the glass member comprises conformable glass.

3. The transaction card of claim 1, wherein the at least one additional layer comprises a pair of opposite capping layers, wherein the partial glass layer is disposed between the pair of opposite capping layers.

4. The transaction card of claim 3, wherein the opposite capping layers comprise materials selected from the group consisting of: polymeric materials, ceramic, and glass.

5. The transaction card of claim 1, wherein the at least one additional layer comprises printed information or graphics.

6. The transaction card of claim 1, wherein the frame comprises metal.

7. The transaction card of claim 6, wherein the at least one additional layer comprises a booster antenna layer comprising a booster antenna physically or inductively connected to the payment module.

8. The transaction card of claim 7, wherein the at least one additional layer further comprises at least a non-metal base layer and one or more printed layers.

9. The transaction card of claim 7, further comprising a non-RF-impeding layer between the booster antenna and the metal frame.

10. The transaction card of claim 6, wherein the glass member has a first thickness and the frame has a second thickness greater than the first thickness, wherein the partial glass layer constitutes an outermost layer of the transaction card, and the frame defines a greater elevation on the surface of the card relative to the at least one additional layer than an elevation defined by the glass member.

11. The transaction card of claim 1, wherein the frame comprises a non-metal material.

12. The transaction card of claim 11, wherein the non-metal material comprises a material selected from the group consisting of: epoxy, FR4 ceramic, carbon fiber, and a plant-based material.

13. The transaction card of claim 11, wherein the frame defines an outer peripheral edge, a top surface, and a bottom surface, and the at least one groove is disposed on the top surface, the bottom surface, or a combination thereof, and radially inset from the outer peripheral edge.

14. The transaction card of claim 1, further comprising at least one protective layer over the partial glass layer.

15. The transaction card of claim 1, wherein the outer periphery of the transaction card is defined by a plurality of straight edges and corner regions, wherein the frame defines a plurality of frame widths between the frame outer periphery and the frame inner periphery along the respective plurality of straight edges, including a first frame width between the frame outer periphery and the frame inner periphery along a first edge that defines a card length, a second frame width between the frame outer periphery and the frame inner periphery along a second edge that defines a card width perpendicular to the card length, a third frame width between the frame outer periphery and the frame inner periphery along a third edge parallel to and opposite the first edge, and a fourth frame width between the frame outer periphery and the frame inner periphery along a fourth edge parallel to and opposite the second edge, wherein at least one of the plurality of frame widths is uniform along an entirety of the respective straight edge.

16. The transaction card of claim 15, wherein at least one of the plurality of frame widths is uniform along an entirety of the respective straight edge except in at least one tab portion that has a greater width between the frame outer periphery and the frame inner periphery than in a remainder of the entirety of the respective straight edge.

17. The transaction card of claim 16, comprising one or more electronic components disposed in the at least one tab portion.

18. The transaction card of claim 17, wherein the at least one tab portion consists of a singular tab portion on one edge and the one or more electronic components consists of a payment module.

19. The transaction card of claim 16, wherein the plurality of frame widths comprise a plurality of tab portions and the one or more electronic components are selected from the group consisting of: a payment module, a display screen, and a biometric sensor.

20. The transaction card of claim 15, wherein at least one of the frame widths has a variable width along the respective straight edge.

21. The transaction card of claim 15, wherein the card length is greater than the card width.

22. The transaction card of claim 21, wherein the corner regions are rounded and have a radius.

23. The transaction card of claim 22, wherein each of the plurality of frame widths has a respective uniform width along an entirety of the respective straight edge except in an optional tab portion that has a greater width between the frame outer periphery and the frame inner periphery than in a remainder of the entirety of the respective straight edge.

24. The transaction card of claim 23, wherein the respective uniform width of at least one of the plurality of frame widths is different than the respective uniform width of at least another of the plurality of frame widths.

25. The transaction card of claim 23, wherein the respective uniform width of the first frame width and the respective uniform width of the third frame width are equal, and the respective uniform width of the second frame width and the respective uniform width of the fourth frame width are equal.

26. The transaction card of claim 23, wherein the respective uniform width of the first frame width, the respective uniform width of the second frame width, the respective uniform width of the third frame width, and the respective uniform width of the fourth frame width are equal.

* * * * *